Patented Jan. 26, 1954

2,667,126

UNITED STATES PATENT OFFICE 2,667,126

LUBRICANT PUMP

Camille Clare Sprankling Le Clair, London, England, assignor to Tecalemit Limited, Brentford, England, a corporation of Great Britain Application April 28, 1948, Serial No. 23,736

Claims priority, application Great Britain May 21, 1947

11 Claims. (Cl. 103—50)

This invention relates to distribution apparatus for use with lubricants and with liquids and semi-liquids.

One of the objects of the invention is the provision of improved apparatus which is particularly intended for lubricants but which is also applicable to apparatus designed for the distribution of other liquid and semi-liquid substances. For the sake of convenience, reference will be made hereinafter to "lubricants" in which term it is intended to include all such other liquids and semi-liquids, and all distribution apparatus to which the invention relates will be referred to as "distribution apparatus" or "lubricant distribution apparatus."

The invention relates more particularly to lubricant distribution apparatus of the type which comprises at least one displacement unit which includes a chamber containing a movable displacement member, means for supplying lubricant to the chamber on one side of the said member and means for applying pressure to the member to cause the latter to discharge the lubricant from the chamber to a place or places of use.

An important object of the present invention is to provide improved distribution apparatus which will recharge itself automatically and in which manual operation of the valves is not required.

The lubricant distribution apparatus according to the present invention includes at least one lubricant displacement unit comprising a lubricant-chamber, adapted to be supplied with lubricant under pressure, having a lubricant-inlet and a lubricant-outlet, a displacement-member movable in the lubricant chamber, an operating chamber, adapted to be supplied with operating-fluid under pressure, having an inlet and an outlet for the operating fluid, a displacement member which is movable in the operating chamber in unison with the first mentioned displacement member, a valve, or valves, controlling the inlet of lubricant to, and the discharge of lubricant from, the said lubricant chamber, a valve for controlling the discharge of operating fluid from the said operating chamber, and automatically-acting means for operating the said valves in such sequence as to cause the displacement members moving in unison, first in one direction, under the pressure of the operating-fluid admitted to the operating chamber, to discharge lubricant from the lubricant chamber through the lubricant outlet and then in the other direction, under the pressure of the lubricant which enters the lubricant chamber, to replenish the latter through the said lubricant inlet, the operating fluid being simultaneously discharged from the operating-chamber through the said fluid-outlet.

The pressure of the lubricant may be produced by means utilising pressure air or other fluid as a medium, and the pressure of the operating fluid may be produced by a direct acting pump or pumps.

The two chambers might be constituted by the two ends of a single cylinder and the two displacement members by the opposite faces of a single piston or equivalent member mounted within this cylinder. It is preferred, however, to make the lubricant chamber separate from the operating chamber, lubricant being admitted to, and discharged from, the space in the lubricant chamber on one side only of the piston therein, and operating fluid being admitted to, and discharged from, the space in the operating chamber on one side only of the piston therein, means being provided for coupling the displacement members so that they move as one.

Various means may be provided for operating the valves, but it is preferred that the operation of the valves shall be controlled in accordance with the mutual movements of the coupled displacement members.

The operation of the valves should be controlled by valve operating mechanism which acts to ensure that when the lubricant chamber is being charged with lubricant, operating fluid is simultaneously being discharged from the operating chamber and while when lubricant is being discharged from the lubricant chamber, operating fluid cannot be discharged from the operating chamber.

The valve operating mechanism may include an actuating member, which is movable into and out of two operative positions by the means coupling the two displacement members, and which is associated with two detention members, one of which acts to hold the actuating member in one of its operative positions during the lubricant-discharging movement of the displacement member in the lubricant chamber, while the other retention member acts to hold the actuating member in its other operative position during the movement of the displacement member in the opposite direction, during which latter movement lubricant is supplied to the lubricant chamber and operating fluid is discharged from the operating chamber.

In one constructional form of the invention, which is more particularly described hereinafter, the actuating member comprises a lever, one end of which is pivotally mounted upon a fixed support and the other end of which is attached to the valve operating mechanism. At about the mid-length of this lever there is an abutment which is engaged by the means coupling the displacement members, whereby the lever is moved into one or other of its operating positions, and there are also two other abutments which are engaged by the retention members whereby the lever is held in one or other of its positions.

In the same construction the retention members consist of pawls, one of which is adapted to engage one said abutment on the actuating member when the latter is in one of its operative positions while the other pawl is adapted to engage the other abutment on the actuating member when the latter is in its other operating position. The pawls are held in engagement with the abutments by means of springs and are released from engagement by means actuated by the two displacement members.

The same construction comprises an outlet valve for controlling the exhaust of operating fluid from the operating chamber, and a valve member, which is movable into and out of two operative positions, for controlling the inlet of lubricant to, and the discharge of lubricant from, the lubricant chamber. The valve operating mechanism includes a member for coupling the means for actuating the outlet valve which controls the exhaust of the operating fluid to the means for actuating the valve member which controls the flow into and out of the lubricant chamber. The coupling member is attached to the actuating member and receives its motion therefrom.

Resilient means are provided for moving the actuating member out of its operative positions after it has been released by the retention members or pawls. The resilient means consist of two springs, one of which is associated with the operating chamber end of the coupled displacement members and the other of which is associated with the lubricant chamber end of the displacement members, the first mentioned spring being loaded during the fluid-inlet and the simultaneous lubricant-discharge movement of the displacement members, and the other spring being loaded during the lubricant-inlet and the simultaneous fluid-discharge movement of the displacement members.

The lubricant distributing apparatus may comprise a number of these displacement units, a number of separate means each adapted to supply operating fluid under pressure to the operating cylinder of one only of the displacement units and means for supplying lubricant under pressure to the lubricant cylinders of all the displacement units.

When the apparatus comprises a number of displacement units they may be operated from a common pressure-fluid pump, or each unit may be operated separately by an individual pump. The individual pumps may be arranged as a multiple unit and this unit may be electrically operated and controlled, this usually being the preferred arrangement.

The lubricant supply source comprises a reservoir from which lubricant is delivered to the various displacement units either by a number of individual pumps, or by a single pump common to all, the latter being usually the preferred arrangement.

One constructional form of the present invention is shown, by way of example, on the accompanying drawings, whereon:

Figure 1:
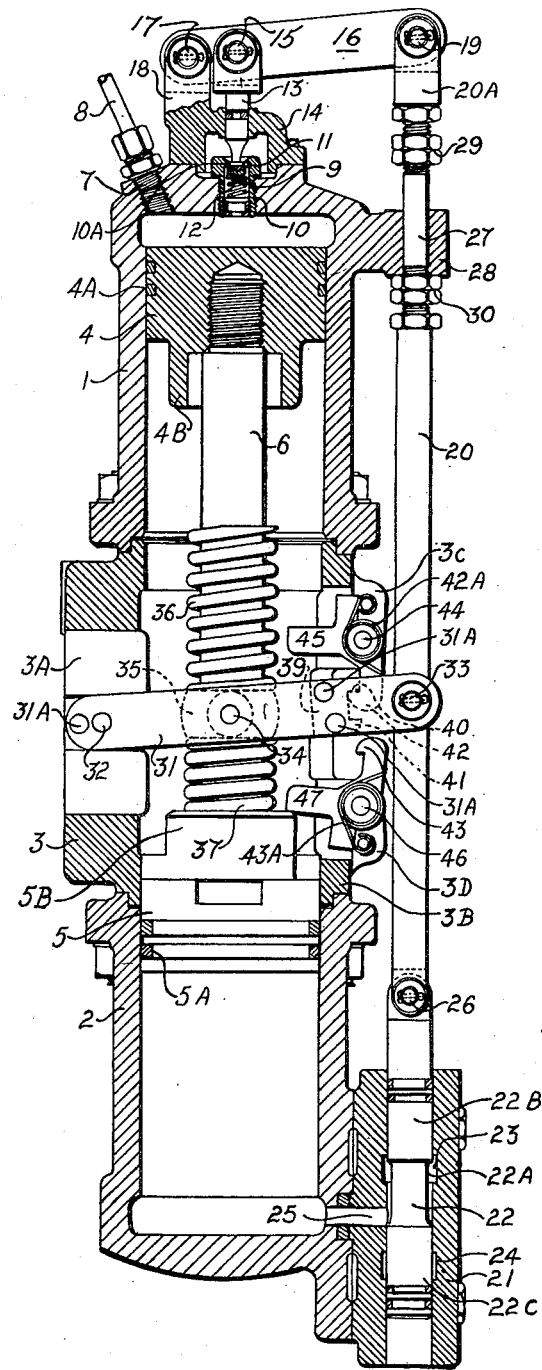
Figure 1 is a sectional elevation of a displacement unit.
Figure 2:
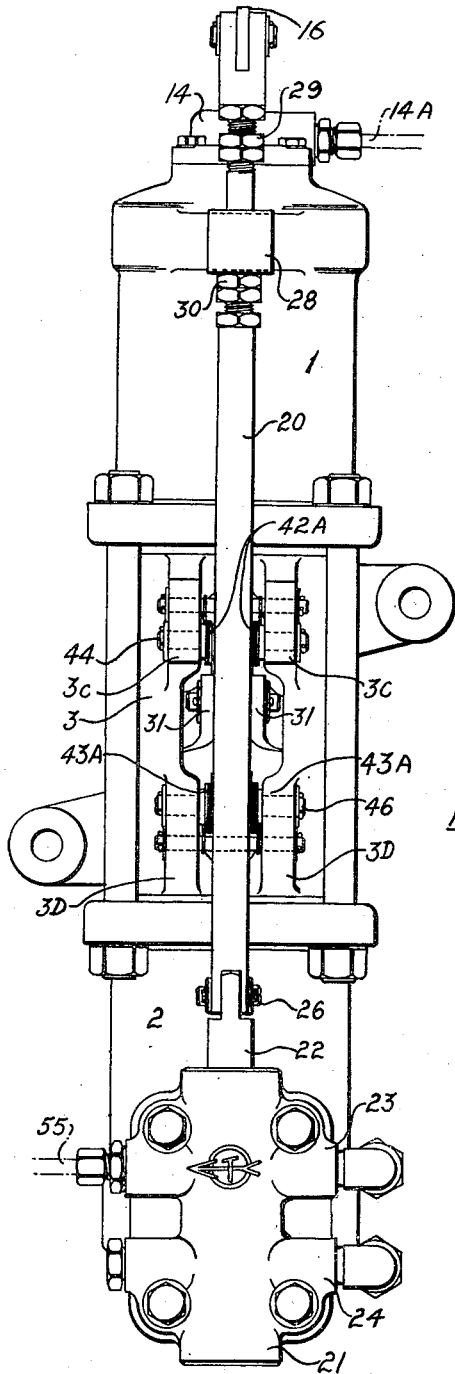
Figure 2 is an outside elevation of the unit.

Referring first to Figures 1 and 2;

This displacement unit comprises an operating cylinder 1, which is arranged at the top of the unit, and a lubricant cylinder 2, which is arranged below it. In the present case it is preferred to use oil as the operating fluid while the lubricant to be distributed is grease.

The two cylinders are mounted on the upper and lower ends of a hollow distance piece 3 which has apertured side walls 3A and 3B and which serves to support the cylinders and also parts of the valve actuating mechanism. Pistons 4 and 5 are slidable respectively in the cylinders 1 and 2 and they are rigidly connected together by means of a piston rod 6 which passes through the hollow distance piece 3. The pistons are provided with piston rings 4A and 5A.

The head of the upper or operating cylinder 1 is provided with an oil inlet connection 7 which is adapted to be connected by a pipe 8 to an oil pump referred to hereinafter. The head also carries an oil outlet valve 9 which is mounted in a hollow cylindrical valve chamber 10 screwed centrally into the cylinder head. The valve is urged outwardly against an annular seat 11, provided in the inside of the upper end of the valve chamber around a central hole 10A, by means of a compression spring 12 fitted within the chamber.

The outlet valve 9 is adapted to be opened against the force of its spring 12 by means of a valve plunger 13 which is slidably mounted in an opening formed in a housing 14 mounted on the cylinder head. The upper end of the plunger is pivotally connected at 15 with an arm 16 one end of which is pivoted at 17 to an upstanding part 18 of the housing 14 and the other end of which is pivotally connected at 19 to an upper forked end 20A of an actuating rod 20 which will be more fully described hereinafter. When the actuating rod pulls the arm 16 down, the lower end of the plunger 13 engages the outlet valve 9 and forces it off its seat. This allows oil to escape from the cylinder to the interior of the housing 14, whence it is led back by a pipe 14A, Figure 2, to an oil reservoir from which the oil pump draws its supply.

A small valve cylinder 21 containing a piston-type slide valve 22 is mounted on the side of the grease cylinder 2. The valve cylinder is formed with three ports, namely a grease outlet port 23 leading to the place of use of the grease, a grease inlet port 24 which is connected to a source of supply of grease under pressure and a central port 25 opening into the grease cylinder 2. The valve 22 is of the known type which comprises a central reduced portion 22A separating two enlarged cylindrical portions 22B and 22C which are slidable in the bore of the cylinder and are fitted with piston rings. In known manner, therefore, the central port 25 communicates with the outlet port 23 when the slide valve is in its upper position and communicates with the inlet port 24 when the slide valve is in its lower position.

The upper end of the slide valve is pivotally connected at 26 with the lower end of the actuating rod 20 the upper end of which is connected, as already described, with the arm 16 controlling the movement of the valve plunger 13. The actuating rod is slidably guided in a hole 27 formed in a lug 28 projecting from the operating cylinder 1 and it is provided with upper and lower pairs of lock nuts 29 and 30 respectively arranged above and below the lug 28. The lock nuts form adjustable stops to limit the upward and downward movement of the actuating rod 20.

Two transversely-spaced actuating levers 31 connected by transverse pins 31A are arranged in the distance piece 3, to the wall 3A of which the levers are pivoted at 32. The other ends of the levers are arranged on opposite sides of, and are pivotally connected at 33 to, the actuating rod 20 near the centre of length of the latter. The piston rod 6 passes through the space between the two levers and the latter are pivotally connected by trunnions 34 to a sleeve 35 which is loosely mounted on the piston rod.

A compression spring 36 is arranged on the piston rod 6 between the sleeve 35 and the piston 4 and a second compression spring 37 is arranged between the sleeve and the piston 5. The respective normal lengths of the springs are such that the lower spring 37 is compressed between the lower piston 5 and the sleeve 35 when the pistons approach the upper limit of their mutual upward stroke, and the upper spring 36 is compressed between the sleeve and the upper piston 4 when the pistons approach the lower limit of their mutual downward stroke.

The actuating levers 31 are provided with a catch plate 39 which is fitted between the levers and is formed with two catches 40 and 41. The upper catch 40 is adapted to be engaged by an upper hook-ended pawl 42 to retain the actuating levers 31 and the actuating rod 20 in their upper positions, while the lower catch 41 is adapted to be engaged by a lower hook-ended pawl 43 to retain the levers and rod in their lower positions.

The upper pawl 42 is pivotally mounted on a pin 44 between spaced lugs 3C on the wall 3B of the distance piece and is urged inwardly by springs 42A. The pawl is integral with an inwardly-extending operating lug 45 which is disposed substantially at right angles to the pawl, and which is adapted to be engaged by the skirt 4B of the upper piston 4 to release the pawl when the piston reaches the lower limit of its travel. Similarly, the lower pawl 43 is pivotally mounted on a pin 46 between spaced lugs 3D on the wall 3B of the distance piece and is urged inwardly by springs 43A. The pawl is integral with an inwardly-extending operating lug 47 which is disposed substantially at right angles to the pawl and is adapted to be engaged by the skirt 5B of the lower piston 5 when the piston reaches the upper limit of its travel.

The operation of the apparatus will now be described, it being assumed that the operating and grease cylinders 1 and 2 contain oil and grease, respectively that the pistons 4 and 5 are in an intermediate position and that the actuating arm 16 and rod 20 are held in their upper positions by the engagement of the upper pawl 42 with its catch 40.

In these conditions, the oil outlet valve 9 in the operating cylinder 1 will be held closed by its spring 12, while the slide valve 22, being in its upper position, will act to put the interior of the grease cylinder 2 in communication with the grease outlet port 23 through the port 25. Consequently, the pressure oil entering the cylinder 1 through the oil inlet 7 will force down the upper piston 4 which, through the piston rod 6, will thus thrust the lower piston 5 downwards to discharge grease under pressure from the lower cylinder 2 through the grease outlet 23 to the place of use of the grease.

As this downward movement of the upper and lower pistons continues, the upper piston will first engage the upper compression spring 36 and then compress it against the sleeve 35 which, together with the actuating levers 31, will, however, remain stationary owing to the levers being held by the upper pawl 42. As the movement of the pistons continues, however, the upper piston will eventually engage the lug 45 and depressing it will ultimately release the upper pawl 42 from engagement with the catch 40. The upper spring 36 will now assert itself to force the actuating levers 31 to their lower position in which the levers will be engaged and held by the engagement of the catch 41 with the lower pawl 43.

This motion of the actuating levers moves the actuating rod 20 and the arm 16 in a downward direction, causing the plunger 13 to move downwards and to open the outlet valve 9 in the operating cylinder 1 and also moving the slide valve 22 to its lower position, in which it cuts off communication between the grease cylinder 2 and the grease outlet 23 and connects the cylinder to the grease inlet 24.

The grease supplied to the inlet 24 is under pressure and, consequently, as soon as the slide valve has moved into the position referred to above, the grease enters the grease cylinder through the port 25, forcing the piston 5 upwards, and thereby re-charging the cylinder. The piston 4 in the operating cylinder 1 is also thrust upwards, this movement being possible since the opening of the oil outlet valve 9 permits the escape of the oil already in the cylinder, thereby relieving the oil pressure, and also permitting the escape of any further oil delivered to it from the oil pump during the movement. It should be noted that under normal conditions the rate of supply of oil to the cylinder 1 is so slow that the loss involved by not shutting off the inlet 7 is negligible.

As the lower piston 5 rises it first engages the lower compression spring 37 and then compresses it against the sleeve 35, which, together with the actuating levers 31, will again remain stationary owing to the levers being held by the engagement of the catch 41 with the lower pawl 43. As the piston movement continues, however, the lower piston 5 will, when the grease cylinder 2 is fully charged, eventually engage the lug 47 and depressing it will, when the grease cylinder is fully charged, release the lower pawl 43, thus allowing the lower spring 37 to assert itself and return the actuating levers 31 and the actuating rod 20 to their upper positions, where the levers will again be held by the engagement of the catch 40 with the upper pawl 42. The slide valve 22 then re-connects the grease cylinder 2 to the outlet 23 and the oil outlet valve 9 closes owing to the upward movement of the plunger 13. Pressure again builds up in the operating cylinder 1 forcing the pistons 4 and 5 downwards and the cycle of operations is repeated.

For practical purposes, for the sake of keeping the various units to a manageable size, it is convenient to mount a number of displacement units such as have been described together in a single assembly.

Similarly, for the sake of convenience in handling it is convenient to mount the operating fluid pump or pumps, the pump driving motor, the grease pump and the grease and operating fluid reservoirs in a separate casing which may be connected to one or more of the multiple displacement unit assemblies as described above.

I claim:

1. In a lubricant distribution apparatus, at least one lubricant displacement unit comprising in combination a lubricant chamber adapted to be supplied with lubricant under pressure, said chamber having an inlet adapted to be connected to a source of lubricant under pressure and a lubricant outlet adapted to be connected to a place of use, a displacement member movable in said chamber, an operating chamber adapted to be supplied with operating fluid under pressure, said operating chamber having an inlet adapted to be connected to a source of operating fluid under pressure and an outlet for the operating fluid, a displacement member movable in said operating chamber, means interconnecting said displacement members for movement in unison, a valve including a movable valve member for controlling the ingress of lubricant to and the discharge of lubricant from said lubricant chamber, a normally closed valve for controlling the discharge of operating fluid through said operating chamber outlet, and an automatically acting linkage mechanism operatively connected to said displacement members to be actuated thereby, said linkage mechanism including a member positioned to engage and open said valve controlling the discharge of operating fluid through said operating chamber outlet, and means connected to said valve member of said valve controlling the ingress of lubricant to and the discharge of lubricant from said lubricant chamber so as to operate said valves substantially simultaneously to close said operating chamber outlet, to open said lubricant chamber outlet, and to close said lubricant chamber inlet so that said displacement members move in a first direction in unison under the pressure of the operating fluid to discharge lubricant from said lubricant chamber, and then to open said operating chamber outlet valve, to open said lubricant chamber inlet and to close said lubricant chamber outlet so that lubricant under pressure will be admitted to said lubricant chamber to move said displacement members in a second direction to discharge the operating fluid from said operating fluid chamber and to charge said lubricant chamber with lubricant.

2. In a lubricant distribution apparatus, at least one lubricant displacement unit comprising in combination means forming a lubricant chamber adapted to be supplied with lubricant under pressure, said chamber having an inlet adapted to be connected to a source of lubricant under pressure and a lubricant outlet adapted to be connected to a place of use, a displacement member movable in said chamber and having only one face acting upon the lubricant, means forming an operating chamber separate from said lubricant chamber adapted to be supplied with operating fluid under pressure, said operating chamber having an inlet adapted to be connected to a source of operating fluid under pressure and an outlet for the operating fluid, a displacement member movable in said operating chamber and having only one face acted upon by the operating fluid, means interconnecting said displacement members for movement in unison, a valve including a movable valve member for controlling the ingress of lubricant to and the discharge of lubricant from said lubricant chamber, a normally closed valve for controlling the discharge of operating fluid through said operating chamber outlet, and an automatically acting linkage mechanism operatively connected to said displacement members to be actuated thereby, said linkage mechanism including a member positioned to engage and open said valve controlling the discharge of operating fluid through said operating chamber outlet, and means connected to said valve member of said valve controlling the ingress of lubricant to and the discharge of lubricant from said lubricant chamber so as to operate said valves substantially simultaneously to close said operating chamber outlet, to open said lubricant chamber outlet and to close said lubricant chamber inlet so that said displacement members move in a first direction in unison under the pressure of the operating fluid to discharge lubricant from said lubricant chamber, and then to open said operating chamber outlet valve, to open said lubricant chamber inlet and to close said lubricant chamber outlet so that lubricant under pressure will be admitted to said lubricant chamber to move said displacement members in a second direction to discharge the operating fluid from said operating fluid chamber and to charge said lubricant chamber with lubricant.

3. In a lubricant distribution apparatus, at least one lubricant displacement unit comprising in combination a lubricant chamber adapted to be supplied with lubricant under pressure, said chamber having an inlet adapted to be connected to a source of lubricant under pressure and a lubricant outlet adapted to be connected to a place of use, a displacement member movable in said chamber, an operating chamber adapted to be supplied with operating fluid under pressure, said operating chamber having an open inlet adapted to be connected to a source of operating fluid under pressure and an outlet for the operating fluid, a displacement member movable in said operating chamber, means interconnecting said displacement members for movement in unison, a valve including a movable valve member for controlling the ingress of lubricant to and the discharge of lubricant from said lubricant chamber, a normally closed valve for controlling the discharge of operating fluid through said operating chamber outlet, and an automatic valve operating linkage mechanism operatively connected to said interconnecting means and to said valves to be actuated by the movement of said displacement members, said linkage mechanism including a member positioned to engage and open said valve controlling the discharge of operating fluid through said operating chamber outlet, and means connected to said valve member of said valve controlling the ingress of lubricant to and the discharge of lubricant from said lubricant chamber so as to operate said valves substantially simultaneously so that when said lubricant chamber is being charged with lubricant, operating fluid is simultaneously being discharged from said operating chamber, and when lubricant is being discharged from said lubricant chamber, operating fluid cannot be discharged from said operating chamber.

4. In a lubricant distribution apparatus, at least one lubricant displacement unit comprising in combination a lubricant chamber adapted to be supplied with lubricant under pressure, said chamber having an inlet adapted to be connected to a source of lubricant under pressure and a lubricant outlet adapted to be connected to a place of use, a displacement member movable in said chamber, an operating chamber adapted to be supplied with operating fluid under pressure, said operating chamber having an inlet adapted to be connected to a source of operating fluid under pressure and an outlet for the operating fluid, a displacement member movable in said operating chamber, means interconnecting said displacement members for movement in unison, a valve including a movable valve member for controlling the ingress of lubricant to and the discharge of lubricant from said lubricant chamber, a normally closed valve for controlling the discharge of operating fluid through said operating chamber outlet, and an automatic valve operating mechanism operatively connected to said interconnecting means to be actuated by the movement of said displacement members, said automatic valve operating mechanism including an actuating member movable into and out of two operative positions, a second member connected to said actuating member and positioned to engage and open said valve controlling the discharge of operating fluid through said operating chamber outlet, and means connecting said actuating member to said valve member of said valve controlling the ingress of lubricant to and the discharge of lubricant from said lubricant chamber so as to operate said valves substantially simultaneously so that when said lubricant chamber is being charged with lubricant, operating fluid is simultaneously being discharged from said operating chamber, and when lubricant is being discharged from said lubricant chamber, operating fluid cannot be discharged from said operating chamber, and said automatic valve operating mechanism also including a pair of retention members, each adapted to hold said actuating member in one of its operative positions.

5. In a lubricant distribution apparatus, at least one lubricant displacement unit comprising in combination a lubricant chamber adapted to be supplied with lubricant under pressure, said chamber having an inlet adapted to be connected to a source of lubricant under pressure and a lubricant outlet adapted to be connected to a place of use, a displacement member movable in said chamber, an operating chamber adapted to be supplied with operating fluid under pressure, said operating chamber having an inlet adapted to be connected to a source of operating fluid under pressure and an outlet for the operating fluid, a displacement member movable in said operating chamber, means interconnecting said displacement members for movement in unison, a valve including a movable valve member for controlling the ingress of lubricant to and the discharge of lubricant from said lubricant chamber, a normally closed valve for controlling the discharge of operating fluid through said operating chamber outlet, and an automatic valve operating mechanism operatively connected to said interconnecting means to be actuated by the movement of said displacement members, said automatic valve operating mechanism including an actuating member movable into and out of two operative positions, a second member connected to said actuating member and positioned to engage and open said valve controlling the discharge of operating fluid through said operating chamber outlet, and means connecting said actuating member to said valve member of said valve controlling the ingress of lubricant to and the discharge of lubricant from said lubricant chamber so as to operate said valves substantially simultaneously so that when said lubricant chamber is being charged with lubricant, operating fluid is simultaneously being discharged from said operating chamber, and when lubricant is being discharged from said lubricant chamber, operating fluid cannot be discharged from said operating chamber, and said automatic valve operating mechanism also including a pair of abutments carried by said actuating member, and a pair of pawls, each adapted to engage one of said abutments to hold said actuating member in one of its operative positions.

6. In a lubricant distribution apparatus, at least one lubricant displacement unit comprising in combination a lubricant chamber adapted to be supplied with lubricant under pressure, said chamber having an inlet adapted to be connected to a source of lubricant under pressure and a lubricant outlet adapted to be connected to a place of use, a displacement member movable in said chamber, an operating chamber adapted to be supplied with operating fluid under pressure, said operating chamber having an inlet adapted to be connected to a source of operating fluid under pressure and an outlet for the operating fluid, a displacement member movable in said operating chamber, means interconnecting said displacement members for movement in unison, a valve including a movable valve member for controlling the ingress of lubricant to and the discharge of lubricant from said lubricant chamber, a normally closed valve for controlling the discharge of operating fluid through said operating chamber outlet, and an automatic valve operating mechanism operatively connected to said interconnecting means to be actuated by the movement of said displacement members, said automatic valve operating mechanism including an actuating member movable into and out of two operative positions, a second member connected to said actuating member and positioned to engage and open said valve controlling the discharge of operating fluid through said operating chamber outlet, and means connecting said actuating member to said valve member of said valve controlling the ingress of lubricant to and the discharge of lubricant from said lubricant chamber so as to operate said valves substantially simultaneously so that when said lubricant chamber is being charged with lubricant, operating fluid is simultaneously being discharged from said operating chamber, and when lubricant is being discharged from said lubricant chamber, operating fluid cannot be discharged from said operating chamber, and said automatic valve operating mechanism also including a pair of abutments carried by said actuating member, a pair of pawls, each adapted to engage one of said abutments to hold said actuating member in one of its operative positions, and spring means biasing said pawls toward abutment engaging position, said pawls being released by said displacement members.

7. In a lubricant distribution apparatus, at least one lubricant displacement unit comprising in combination a lubricant chamber adapted to be supplied with lubricant under pressure, said chamber having an inlet adapted to be connected to a source of lubricant under pressure and a lubricant outlet adapted to be connected to a place of use, a displacement member movable in said chamber, an operating chamber adapted to be supplied with operating fluid under pressure, said operating chamber having an inlet adapted to be connected to a source of operating fluid under pressure and an outlet for the operating fluid, a displacement member movable in said operating chamber, means interconnecting said displacement members for movement in unison, a valve including a movable valve member for controlling the ingress of lubricant to and the discharge of lubricant from said lubricant chamber, a normally closed valve for controlling the discharge of operating fluid through said operating chamber outlet, and an automatic valve operating mechanism operatively connected to said interconnecting means to be actuated by the movement of said displacement members, said automatic valve operating mechanism including an actuating member movable into and out of two operative positions, a second member connected to said actuating member and positioned to engage and open said valve controlling the discharge of operating fluid through said operating chamber outlet, and means connecting said actuating member to said valve member of said valve controlling the ingress of lubricant to and the discharge of lubricant from said lubricant chamber so as to operate said valves substantially simultaneously so that when said lubricant chamber is being charged with lubricant, operating fluid is simultaneously being discharged from said operating chamber, and when lubricant is being discharged from said lubricant chamber, operating fluid cannot be discharged from said operating chamber, and said automatic valve operating mechanism also including an abutment member connected to said actuating member and movable into and out of two operative positions by means associated with said interconnecting means and said displacement members, and a pair of retention members, each adapted to engage said abutment member to hold said actuating member in one of its operative positions, and each having a part lying in the path of movement of one of said displacement members to release said actuating member for movement to one of its operative positions.

8. In a lubricant distribution apparatus, at least one lubricant displacement unit comprising in combination a lubricant chamber adapted to be supplied with lubricant under pressure, said chamber having an inlet adapted to be connected to a source of lubricant under pressure and a lubricant outlet adapted to be connected to a place of use, a displacement member movable in said chamber, an operating chamber adapted to be supplied with operating fluid under pressure, said operating chamber having an inlet adapted to be connected to a source of operating fluid under pressure and an outlet for the operating fluid, a displacement member movable in said operating chamber, means interconnecting said displacement members for movement in unison, a valve having a movable valve member for controlling the ingress of lubricant to and the discharge of lubricant from said lubricant chamber, a normally closed valve for controlling the discharge of operating fluid through said operating chamber outlet, and an automatic valve operating mechanism operatively connected to said interconnecting means to be actuated by the movement of said displacement members, said automatic valve operating mechanism including an actuating member movable into and out of two operative positions, a second member connected to said actuating member and positioned to engage and open said valve controlling the discharge of operating fluid through said operating chamber outlet, and means connecting said actuating member to said valve member of said valve controlling the ingress of lubricant to and the discharge of lubricant from said lubricant chamber so as to operate said valves substantially simultaneously so that when said lubricant chamber is being charged with lubricant, operating fluid is simultaneously being discharged from said operating chamber, and when lubricant is being discharged from said lubricant chamber, operating fluid cannot be discharged from said operating chamber, and said automatic valve operating mechanism also including resilient means interposed between said actuating member and said displacement members, and a pair of retention members, each adapted to hold said actuating member in one of its operative positions, each retention member being releasable by one of said displacement members whereby said resilient means moves said actuating means to one of its two operative positions.

9. In a lubricant distribution apparatus, at least one lubricant displacement unit comprising in combination a lubricant chamber adapted to be supplied with lubricant under pressure, said chamber having an inlet adapted to be connected to a source of lubricant under pressure and a lubricant outlet adapted to be connected to a place of use, a displacement member movable in said chamber, an operating chamber adapted to be supplied with operating fluid under pressure, said operating chamber having an inlet adapted to be connected to a source of operating fluid under pressure and an outlet for the operating fluid, a displacement member movable in said operating chamber, means interconnecting said displacement members for movement in unison, a valve having a movable valve member for controlling the ingress of lubricant to and the discharge of lubricant from said lubricant chamber, a normally closed valve for controlling the discharge of operating fluid through said operating chamber outlet, and an automatic valve operating mechanism operatively connected to said interconnecting means to be actuated by the movement of said displacement members, said automatic valve operating mechanism including an actuating member movable into and out of two operative positions, a second member connected to said actuating member and positioned to engage and open said valve controlling the discharge of operating fluid through said operating chamber outlet, and means connecting said actuating member to said valve member of said valve controlling the ingress of lubricant to and the discharge of lubricant from said lubricant chamber so as to operate said valves substantially simultaneously so that when said lubricant chamber is being charged with lubricant, operating fluid is simultaneously being discharged from said operating chamber, and when lubricant is being discharged from said lubricant chamber, operating fluid cannot be discharged from said operating chamber, and said automatic valve operating mechanism also including a third member pivotally connected to a fixed part of the unit and to said actuating member, a pair of springs interposed between said third member and each of said displacement members, and a pair of retention members, each adapted to hold said actuating member in one of its operative positions, each retention member being releasable by one of said displacement members whereupon one of said springs moves said actuating member to one of its operative positions.

10. In a lubricant distribution apparatus, at least one lubricant displacement unit comprising in combination a lubricant chamber adapted to be supplied with lubricant under pressure, said chamber having an inlet adapted to be connected to a source of lubricant under pressure and a lubricant outlet adapted to be connected to a place of use, a displacement member movable in said chamber, an operating chamber adapted to be supplied with operating fluid under pressure, said operating chamber having an inlet adapted to be connected to a source of operating fluid under pressure and an outlet for the operating fluid, a displacement member movable in said operating chamber, means interconnecting said displacement members for movement in unison, a valve including a movable valve member for controlling the ingress of lubricant to and the discharge of lubricant from said lubricant chamber, a normally closed valve for controlling the discharge of operating fluid through said operating chamber outlet, and an automatic valve operating mechanism operatively connected to said interconnecting means to be actuated by the movement of said displacement members, said automatic valve operating mechanism including an actuating member movable into and out of two operative positions, a second member connected to said actuating member and positioned to engage and open said valve controlling the discharge of operating fluid through said operating chamber outlet, and means connecting said actuating member to said valve member of said valve controlling the ingress of lubricant to and the discharge of lubricant from said lubricant chamber so as to operate said valves substantially simultaneously so that when said lubricant chamber is being charged with lubricant, operating fluid is simultaneously being discharged from said operating chamber, and when lubricant is being discharged from said lubricant chamber, operating fluid cannot be discharged from said operating chamber, and said automatic valve operating mechanism also including a third member pivotally connected to a fixed part of the unit and to said actuating member, a pair of springs interposed between said third member and each of said displacement members, a pair of abutments on said third member, a pair of pawls, each adapted to engage one of said abutments to hold said actuating member in one of the operative positions, spring means biasing said pawls toward abutment engaging position, and means engageable by said displacement members at one end of their respective strokes to release said pawls from said abutments whereby one of said springs moves said actuating member to one of its operative positions.

11. In a lubricant distribution apparatus, at least one lubricant displacement unit comprising in combination a lubricant chamber adapted to be supplied with lubricant under pressure, said chamber having an inlet and a lubricant outlet adapted to be connected to a place of use, a source of lubricant under pressure, means connecting said inlet to said lubricant source, a displacement member movable in said chamber, an operating chamber adapted to be supplied with operating fluid under pressure, said operating chamber having an inlet and an outlet for the operating fluid, a source of operating fluid under pressure, means connecting said last named inlet to said operating fluid source, a displacement member movable in said operating chamber, means interconnecting said displacement members for movement in unison, a valve having a movable valve member for controlling the ingress of lubricant to and the discharge of lubricant from said lubricant chamber, a normally closed valve for controlling the discharge of operating fluid through said operating chamber outlet, and an automatically acting linkage mechanism operatively connected to said displacement members to be actuated thereby, said linkage mechanism including a member positioned to engage and open said valve controlling the discharge of operating fluid through said operating chamber outlet, and means connected to said valve member of said valve controlling the ingress of lubricant to and the discharge of lubricant from said lubricant chamber so as to operate said valves substantially simultaneously to close said operating chamber outlet, to open said lubricant chamber outlet and to close said lubricant chamber inlet so that said displacement members move in a first direction in unison under the pressure of the operating fluid to discharge lubricant from said lubricant chamber, and then to open said operating chamber outlet valve, to open said lubricant chamber inlet and to close said lubricant chamber outlet so that lubricant under pressure will be admitted to said lubricant chamber to move said displacement members in a second direction to discharge the operating fluid from said operating fluid chamber and to charge said lubricant chamber with lubricant.

CAMILLE CLARE SPRANKLING LE CLAIR.

References Cited in the file of this patent

UNITED STATES PATENTS

| Number | Name | Date |
| --- | --- | --- |
| 526,429 | Worthington | Sept. 25, 1894 |
| 1,591,693 | Atz | July 6, 1926 |
| 1,698,159 | Goddard | Jan. 8, 1929 |
| 1,931,894 | Gill | Oct. 24, 1933 |
| 2,252,939 | McCoy | Aug. 19, 1941 |